US008582498B2

(12) United States Patent  
Bishop

(10) Patent No.: US 8,582,498 B2
(45) Date of Patent: Nov. 12, 2013

(54) SERVICE SUBSCRIPTION USING GEOPHYSICAL LOCATION

(75) Inventor: Donald M. Bishop, Highlands Ranch, CO (US)

(73) Assignee: Sandwave IP, LLC, Loveland, CO (US)

( * ) Notice: Subject to any disclaimer, the term of this patent is extended or adjusted under 35 U.S.C. 154(b) by 1664 days.

(21) Appl. No.: 11/682,365

(22) Filed: Mar. 6, 2007

(65) Prior Publication Data

US 2007/0213049 A1    Sep. 13, 2007

Related U.S. Application Data

(60) Provisional application No. 60/779,814, filed on Mar. 7, 2006.

(51) Int. Cl.
  H04W 4/00    (2009.01)
  H04M 1/66    (2006.01)
  H04M 1/68    (2006.01)
  H04M 3/16    (2006.01)

(52) U.S. Cl.
  USPC .................. 370/328; 455/411; 455/435.1

(58) Field of Classification Search
  USPC ............. 370/328, 339, 329, 338; 455/41.2, 455/404.2, 406, 456.1, 456.3, 410, 411, 455/435.1; 726/1–7, 27–30
  See application file for complete search history.

(56) References Cited

U.S. PATENT DOCUMENTS

| 5,262,588 A | 11/1993 | Gallagher |
| 5,548,806 A | 8/1996 | Yamaguchi et al. |
| 5,721,819 A | 2/1998 | Galles et al. |
| 5,940,765 A | 8/1999 | Haartsen |
| 5,946,618 A | 8/1999 | Agre et al. |
| 5,952,972 A | 9/1999 | Ittipiboon et al. |
| 6,014,564 A | 1/2000 | Donis et al. |
| 6,023,618 A | 2/2000 | Janhonen et al. |
| 6,028,853 A | 2/2000 | Haartsen |
| 6,055,429 A | 4/2000 | Lynch |
| 6,075,990 A | 6/2000 | Shin |
| 6,081,723 A | 6/2000 | Mademann |

(Continued)

FOREIGN PATENT DOCUMENTS

| EP | 1172969 A2 | 1/2002 |
| JP | 9232850 A | 9/1997 |

(Continued)

OTHER PUBLICATIONS

The Wi-Fi Business Model—Is There One?, Brighthand.com, http//www.brighthand.com/printArticle.asp?newsID=1950, Mar. 17, 2004.*

(Continued)

Primary Examiner — Dwayne Bost
Assistant Examiner — Larry Sternbane
(74) Attorney, Agent, or Firm — Russell S. Krajec; Krajec Patent Offices, LLC

(57) ABSTRACT

Subscriptions to a network may be limited to certain geographic areas by defining a geographic area for the subscriber, identifying all of the network access points with the geographic area, and enabling the subscriber to access the network through those network access points. The network access points may be outfitted with Global Positioning System receivers or other geophysical location determination mechanisms such that the actual location of the network access point is used in determining a subscriber's permitted access.

20 Claims, 3 Drawing Sheets

(56) References Cited

U.S. PATENT DOCUMENTS

| | | |
|---|---|---|
| 6,085,238 A | 7/2000 | Yuasa et al. |
| 6,112,082 A | 8/2000 | Almgren et al. |
| 6,125,276 A | 9/2000 | Lupien |
| 6,324,402 B1 | 11/2001 | Waugh et al. |
| 6,344,833 B1 | 2/2002 | Lin et al. |
| 6,351,463 B1 | 2/2002 | DeSantis et al. |
| 6,484,012 B1 | 11/2002 | Nche et al. |
| 6,594,273 B1 | 7/2003 | McGibney |
| 6,665,296 B1 | 12/2003 | Sturza et al. |
| 6,771,673 B1 | 8/2004 | Baum et al. |
| 6,897,373 B2 | 5/2005 | Barabash |
| 6,898,433 B1 | 5/2005 | Rajaniemi et al. |
| 6,903,702 B2 | 6/2005 | Kawai et al. |
| 6,917,804 B2 | 7/2005 | Takayama et al. |
| 6,948,000 B2 | 9/2005 | Desai et al. |
| 6,961,555 B1 | 11/2005 | Philyaw |
| 6,980,819 B2 | 12/2005 | Sugaya et al. |
| 7,010,015 B2 | 3/2006 | Hervey, Jr. et al. |
| 7,019,691 B1 | 3/2006 | Soltanian et al. |
| 7,035,637 B2 * | 4/2006 | Motegi et al. ............. 455/435.1 |
| 7,039,392 B2 | 5/2006 | McCorkle et al. |
| 7,047,009 B2 | 5/2006 | Laroia et al. |
| 7,069,009 B2 | 6/2006 | Li et al. |
| 7,072,346 B2 | 7/2006 | Hama |
| 7,072,360 B2 | 7/2006 | Dravida et al. |
| 7,096,000 B2 | 8/2006 | Yano |
| 7,171,460 B2 * | 1/2007 | Kalavade et al. ............. 709/223 |
| 7,231,221 B2 | 6/2007 | Assarsson et al. |
| 7,233,804 B2 | 6/2007 | Sugaya et al. |
| 7,254,405 B2 | 8/2007 | Lin et al. |
| 7,280,534 B2 | 10/2007 | Koppol |
| 7,313,127 B2 | 12/2007 | Hoctor et al. |
| 7,406,298 B2 | 7/2008 | Luglio et al. |
| 7,412,246 B2 | 8/2008 | Lewis et al. |
| 7,457,271 B2 | 11/2008 | Donovan |
| 7,471,955 B2 | 12/2008 | Muramatsu |
| 7,499,460 B2 | 3/2009 | Csapo |
| 7,519,036 B2 * | 4/2009 | Zhang ........................... 370/338 |
| 7,539,161 B2 | 5/2009 | Bolin et al. |
| 7,545,826 B2 | 6/2009 | Sugaya |
| 7,552,034 B2 | 6/2009 | Ebata et al. |
| 7,555,260 B2 * | 6/2009 | Melkesetian ................. 455/11.1 |
| 7,573,862 B2 | 8/2009 | Chambers et al. |
| 7,586,879 B2 | 9/2009 | Chari et al. |
| 7,593,718 B2 * | 9/2009 | Gorday et al. ............. 455/412.1 |
| 7,606,938 B2 | 10/2009 | Roese et al. |
| 7,630,311 B2 | 12/2009 | Jung et al. |
| 7,676,226 B2 | 3/2010 | Han et al. |
| 7,689,225 B2 | 3/2010 | Funato et al. |
| 7,706,369 B2 | 4/2010 | Roese et al. |
| 7,729,337 B2 | 6/2010 | Saleh et al. |
| 2002/0011953 A1 | 1/2002 | Reece et al. |
| 2002/0061756 A1 | 5/2002 | Bleckert et al. |
| 2002/0068584 A1 | 6/2002 | Gage et al. |
| 2002/0105965 A1 | 8/2002 | Dravida et al. |
| 2003/0008659 A1 | 1/2003 | Waters et al. |
| 2003/0128987 A1 | 7/2003 | Mayer |
| 2003/0133450 A1 | 7/2003 | Baum |
| 2003/0145106 A1 | 7/2003 | Brown |
| 2004/0184477 A1 | 9/2004 | Tavli et al. |
| 2004/0185859 A1 | 9/2004 | Barkan |
| 2005/0068934 A1 | 3/2005 | Sakoda |
| 2005/0124294 A1 | 6/2005 | Wentink |
| 2005/0190757 A1 | 9/2005 | Sajassi |
| 2005/0286486 A1 | 12/2005 | Miller |
| 2006/0018276 A1 | 1/2006 | Kim et al. |
| 2006/0046746 A1 | 3/2006 | Ranford et al. |
| 2006/0089099 A1 | 4/2006 | Buchwald et al. |
| 2007/0015516 A1 * | 1/2007 | Huotari et al. ............. 455/456.1 |
| 2007/0115883 A1 * | 5/2007 | Narayanan et al. ........... 370/331 |
| 2008/0133665 A1 | 6/2008 | Lybeck et al. |
| 2008/0298275 A1 * | 12/2008 | De Sousa ..................... 370/255 |

FOREIGN PATENT DOCUMENTS

| | | |
|---|---|---|
| JP | 2001000004307 | 7/2002 |
| KR | 1020010025591 | 4/2001 |
| WO | WO 98/12885 A2 | 3/1998 |
| WO | WO 2004/062198 A1 | 7/2004 |

OTHER PUBLICATIONS

Press Release from Nashville International Airport, Oct. 30, 2004, "WiFi has officially arrived at the Nashville International Airport!".*

Have Wi-Fi, Will Travel, Flynn, Mary Kathleen, US News & World Report, May 2, 2004.*

Haussman, Glenn, "New Wi-Fi Technology Debuts at Major Hotel Brands," Hotel Interactive, Mar. 13, 2003.*

"3rd Generation Partnership Project; Technical Specification Group Services and System Aspects; Functional Stage 2 Description of Location Services (LCS) Release 7", 3GPP TS 23.271 v7.3.0, Mar. 24, 2005.

"3rd Generation Partnership Project; Technical Specification Group Services and System Aspects; Vocabulary for 3GPP Specifications (Release 5)", 3GPP TR 21.905 v5.9.0, Mar. 24, 2005.

IEEE Computer Society, "802.11 FTM IEEE Trial-Use Recommended Practice for Multi-Vendor Access Point Interoperability via an Inter-Access Point Protocol Across Distribution Systems Supporting IEEE 802.11™ Operation", Jul. 14, 2003, Institute for Electrical and Electronics Engineers, Inc., NY, USA.

International Search Report and Written Opinion for PCT/US2006/017222 dated Aug. 25, 2006.

International Search Report and Written Opinion for PCT/US2006/017223 dated Aug. 25, 2006.

International Search Report and Written Opinion for PCT/US2006/027145 dated Dec. 18, 2006.

"Spontaneous synchronization in multihop embedded sensor networks: demonstration of a server-free approach," Bletsas, A.; Lippman, A.; Wireless Sensor Networks, 2005. Proceeedings of the Second European Workshop on Jan. 31-Feb. 2, 2005. pp. 333-341. See: abstract, Sec. I and Sec. IIV.

* cited by examiner

SERVICE SUBSCRIPTION USING GEOPHYSICAL LOCATION

CROSS REFERENCE TO RELATED APPLICATIONS

This application claims priority to and benefit of U.S. Provisional Patent Application Ser. No. 60/779,814 filed 7 Mar. 2006 by Donald M. Bishop entitled "Service Subscription Using Geophysical Location", which is hereby incorporated by reference for all it discloses and teaches.

BACKGROUND OF THE INVENTION

Consumers have a variety of electronic networks to which they may subscribe. Telephony, internet connection, and other communication and data connections are made through various networks on a daily basis. In each network scenario, a subscriber may purchase connectivity to a network with different levels of service, features, and connection speeds.

With the widespread use of network connection points, network operators have offered subscriptions for either a single connection point or through all connection points of the network. Geographic isolation of a subscription has been accomplished by the physical connections over the network. In other words, when a subscription covers a small geographic area, it is usually determined by the network layout and connectivity. For example, if a subscription may be limited to a certain neighborhood, city, or state by allowing a subscriber to access a network through all of the access points along a certain leg or branch of the network.

SUMMARY OF THE INVENTION

Subscriptions to a network may be limited to certain geographic areas by defining a geographic area for the subscriber, identifying all of the network access points with the geographic area, and enabling the subscriber to access the network through those network access points. The network access points may be outfitted with Global Positioning System receivers or other geophysical location determination mechanisms such that the actual location of the network access point is used in determining a subscriber's permitted access.

DETAILED DESCRIPTION OF THE INVENTION

Figure 1:
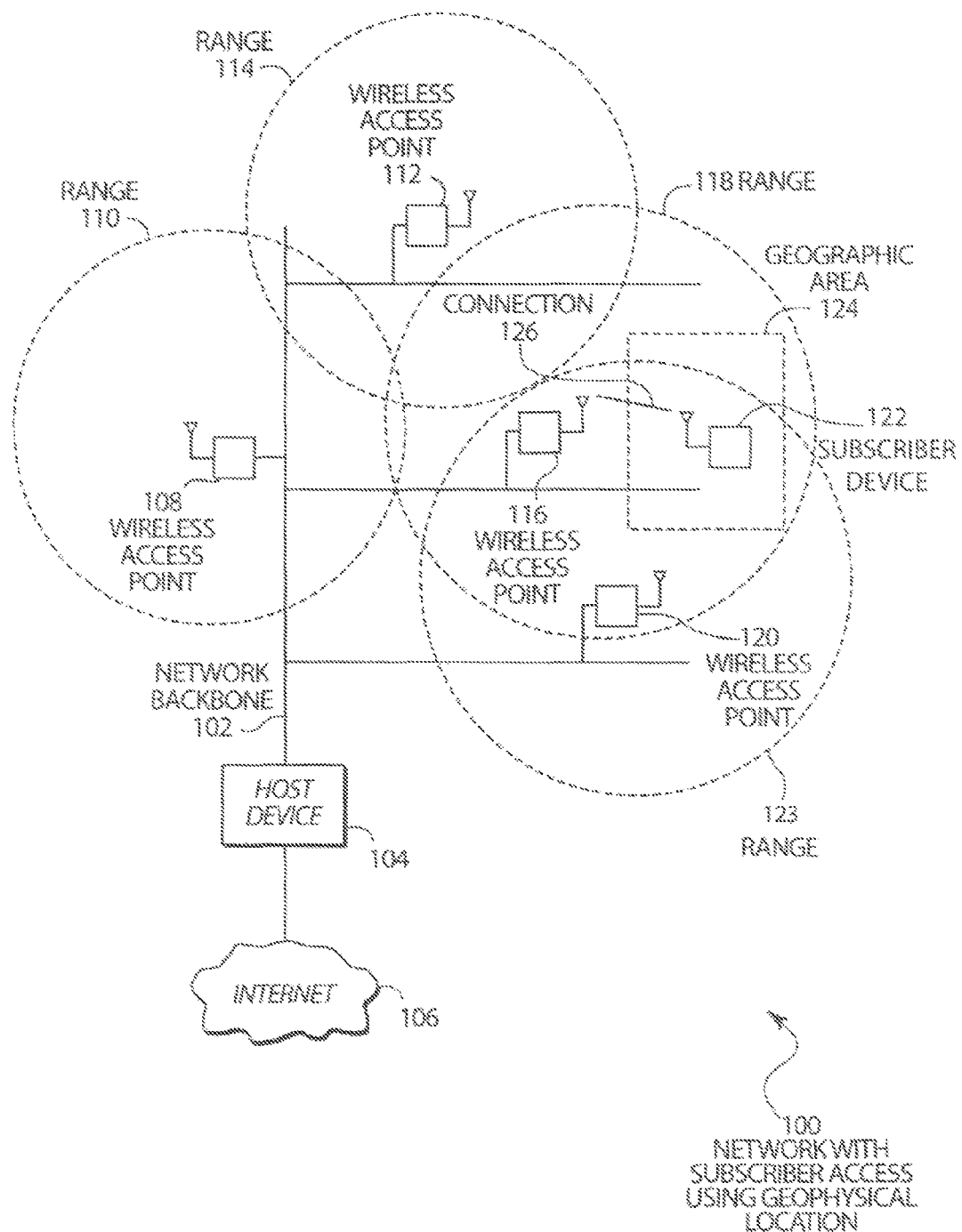
FIG. 1 is a diagrammatic illustration of an embodiment showing a network with subscriber access that uses geophysical location information concerning the subscriber access points.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the subject matter as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Throughout this specification, the term "comprising" shall be synonymous with "including," "containing," or "characterized by," is inclusive or open-ended and does not exclude additional, unrecited elements or method steps. "Comprising" is a term of art which means that the named elements are essential, but other elements may be added and still form a construct within the scope of the statement. "Comprising" leaves open for the inclusion of unspecified ingredients even in major amounts.

FIG. 1 illustrates an embodiment 100 showing a network with subscriber access using geophysical location. The network backbone 102 may connect various devices to a host device 104 that may provide access to the internet 106 or other network. Various wireless access points 108, 112, 116, and 120 are shown attached to the network 102 and having ranges 110, 114, 118, and 123, respectively. A subscriber device 122 makes a request for service in a geographic area 124 through a connection 126.

Embodiment 100 illustrates how a subscriber device 122 may request a subscription in a geographic area 124 that may require multiple wireless access points 116 and 120 to provide the requested service. When the subscription is defined, those wireless access points having service coverage in the geographic area 124 are identified and made available to the subscriber device 122. In order to determine the geophysical layout of the network, each wireless access point may comprise a Global Positioning System receiver, a stored memory location comprising geophysical coordinates, or any other mechanism by which the geophysical location of the various devices may be determined. Devices servicing a subscriber's particular geographic area 124 may then be identified and made available to the subscriber device 122.

The embodiment 100 may be used in many different scenarios. For example, a subscriber may purchase a limited subscription for using a wireless network in an airport facility. When the subscriber uses a wireless device to contact a first of the wireless access points within the airport, the subscription may cause all of the wireless access points within the airport perimeter to be configured for the subscriber's use. In another example, a business subscriber may wish to connect to any of several devices that provide connection services to a large company's building.

In an example of network access to a school for example, several wireless access points may be placed in the neighborhood surrounding a school campus. Additional devices may be provided on the school grounds. A subscription by a student or faculty of the school may permit access to be provided by the devices on the school grounds plus the devices near the perimeter of the school grounds but located in the surrounding neighborhoods.

In some cases, the subscriber may select a geographic boundary for the subscription. The geographic boundary may require access to two or more network access points. In many cases, physically neighboring devices may not be neighboring devices from a network standpoint. For example, the physically neighboring devices 116 and 120 may be on separate branches of a network that are literally miles apart from a network standpoint, but are separated by mere hundreds of yards physically. Situations often arise when a network is built in stages, such as when a subdivision of houses is constructed several years after a previous subdivision that is located across a street. In such a situation, the network path from one device may be extremely long to another device, even through the devices are physically very close together.

The physical location of each device in the network may be accomplished by installing a Global Positioning System receiver or other method for determining the geographic or physical location of the device, even though the device may be permanently mounted. When a subscription is initiated, devices that may be affected by the subscription may be searched and sorted by physical location rather than by network identification. In many cases, the first device that is contacted by the subscriber may have a physical location that is used as a starting point to search for neighboring devices that may also be used by the subscriber.

In wireless networks, a subscriber may connect to a first wireless access point on a regular basis. However, other devices may have an effective range that overlaps the subscriber's location. When the subscriber initiates a subscription, the neighboring device with overlapping service range may also be configured to accept the subscriber's connection. In some cases, the second device may be configured as a backup device that would be used only if a connection with the first device could not be established. In other cases, either device may be configured equally so that the subscriber device may connect with either device in any subsequent session.

The network connection points may be any type of device by which a subscriber may gain access to a network. In some cases the connection points may be wireless while in other cases, the connection points may be a wired connection, such as a kiosk, router, switch, or other device by which a connection may be made.

The network 102 may be any type of communications network that connects several subscriber access devices. In some embodiments, the network 102 may be a hybrid fiber coax (HFC) network commonly used for cable television distribution systems. In other embodiments, the network 102 may be a twisted pair network such as digital subscriber line (DSL) network used in telephony systems. Still other embodiments may use a wireless connection or combination of wireless and wired connections between various devices.

The network topology may be any configuration adaptable to connect different electronic devices. In some embodiments, the topology may be a packet ring network, a branch network, or any other topology.

The wireless access points are one embodiment of a subscriber access point on the network. In wireless cases, the subscriber access point may comprise a radio transceiver that provides connection for a subscriber's wireless device to the network. In such cases, the wireless connection may be a radio connection, an infrared data link, an ultrasonic connection, or any other type of wireless connection. Such radio connection may include microwave data links, cellular telephony, IEEE 802.11 data links, Bluetooth connections, or any other radio connection. In other embodiments, the subscriber device may connect using a wired connection to various portals or connection points on the network.

Information regarding the permitted subscriber access points may be stored in the subscriber device 122. In such a case, the subscriber device 122 may contain appropriate information necessary to authenticate and establish connectivity with each of the identified subscriber access points servicing the geographic area 124. In embodiment 100, wireless access points 116 and 120 would be the subscriber access points servicing the geographic area 124, as the ranges 118 and 123 are the only ranges that overlap the geographic area 124.

In other embodiments, the subscriber access points may process the authentication and set up of a subscriber device on the network. In such a case, the subscriber access point may have a database of approved subscribers for the network. When a subscription is set up to include several subscriber access points, each of the subscriber access points may be configured with the necessary information to allow the subscriber to have access at those locations. In the embodiment 100, the wireless access points 116 and 120 may be configured to accept the subscriber device 122 onto the network.

In some embodiments, the host device 104 may have a database that contains geophysical location information for each of the devices on the network. The host device 104 may further handle a subscription request made by a subscriber and determine which of the network devices would be permitted for the particular subscriber to access. In some embodiments, the host device 104 may perform at least part of the authentication routine for a communication session to be established between a subscriber device and any of the network access points.

For example, when a subscriber device 122 contacts one of the devices 116 or 120 to establish a working connection, a request to the host device 104 may include the subscriber device identification. A database of permitted network connection devices for that subscriber may be queried to determine if one or both of the devices 116 or 120 are within the subscription agreement for that particular subscriber. If one or both of the devices 116 or 120 are within the subscription agreement, the host device 104 may return a result that permits the subscriber to have access. Such an example may be considered to be a centralized, server-type architecture.

In other embodiments, the various access points may be configured with a list of permitted subscribers for each individual access point. Each access point may have a separate list of permitted subscriber that may be populated by a subscription process that identifies the location of permitted access points and configures each permitted access point by adding the subscriber's information to the various subscription list. Such an example may be considered a distributed system where no central server or host device 104 may be used.

In still other embodiments, the subscriber device 122 may have a list of permitted network access points and a set of appropriate passwords or other authentication keys that are used for individual access points. During the subscription process, each permitted access point may be identified and the authentication keys or other information for each access point may be downloaded to the subscriber device 122. The subscriber device 122 may maintain a list of permitted access points and select from the list while gaining access to the network as required.

Regardless of the authentication routine and which tasks or data are performed or stored in which location, the physical location of the network connection points are used to select the proper device to which a subscriber may connect. The physical location determination may be by querying specific devices within a certain distance from a first network connection point, or a geographic boundary may be determined by the subscriber.

In some embodiments, a subscription method may include determining a geographic boundary for the subscriber and querying a database to find any other devices within the boundary. Such an embodiment may use a host device 104 to perform such queries, or copies of such a database may be located within various network connection points that process subscription requests. In some embodiments, all or only a subset of the network connection points may perform subscription requests.

In other embodiments, a subscription method may include sending a broadcast message for devices within a geographic boundary. Many devices may receive the broadcast message and individually determine if that device is within the boundary. For each device that determines that it is physically located within the boundary, a message identifying the device may be sent to a requesting device. In such an embodiment, each device on the network may process the broadcast request by evaluating the physical location parameters within the broadcast request with the physical location parameters of the device. Each device may contain internal physical location information necessary to perform such a comparison.

Figure 2:
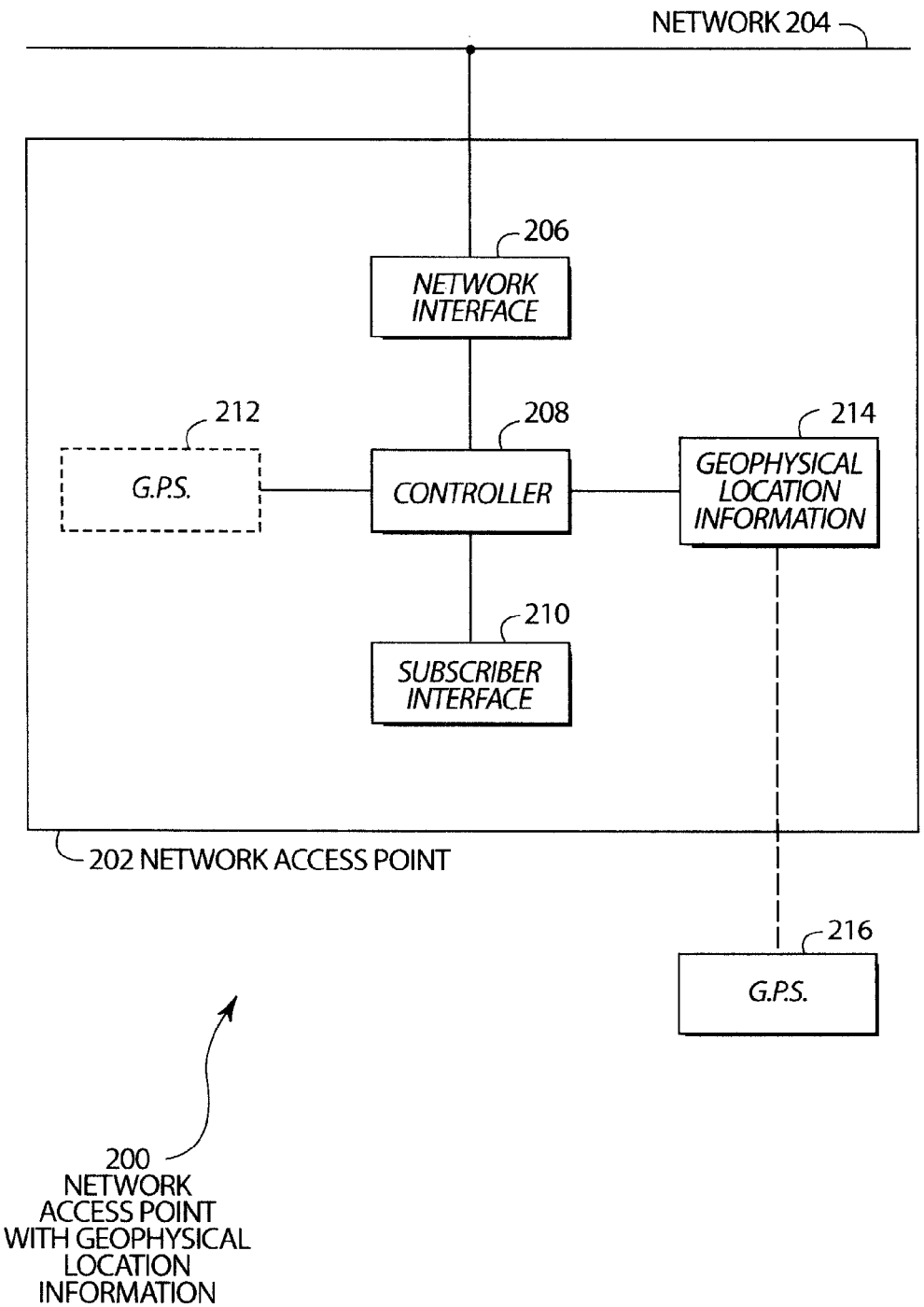
FIG. 2 is a diagrammatic illustration of an embodiment showing a network access point with geophysical location information.

FIG. 2 is a diagrammatic illustration of an embodiment 200 of a network access point with geophysical location information. The network access point 202 is connected to a network 204 through a network interface 206. A controller 208 may connect the network interface 206 with a subscriber interface 210, a Global Positioning System receiver 212, and stored geophysical location information 214. In some embodiments, the geophysical location information 214 may be provided by an external GPS receiver 216 or other external source.

The network access point 202 may provide any type of network connection for a subscriber. In many cases, the network access point 202 may provide wireless access for a subscriber's wireless device. In such cases, the wireless access may be for a roaming situation where the subscriber may move from one network access point 202 to another network access point while keeping connected to the network. For example, a wireless telephony device may connect to the network access point 202 while a subscriber is moving in a vehicle. As the subscriber moves out of range of the network access point 202, the subscriber's connection may be handed off to a neighboring network access point so that the subscriber's session is continued without interruption.

In other cases, a subscriber may establish a connection with the network access point 202 that will last an entire session. For example, a subscriber may connect to a wireless access point while sitting in a coffee shop or airport lounge, in which case an entire session may be performed through a single wireless access point.

In other situations, the network access point 202 may connect with a subscriber device using wired connections. A user may plug in an Ethernet or other wired connection to the subscriber interface 210 to gain access to the network 204. Such embodiments may be useful when high speed data connections or high security are required.

The network 204 may be any type of communication network, including hardwired networks and wireless networks. In some widely distributed networks, the network 204 may include twisted pair networks such as used in modern telephony systems, fiber optic connections, and hybrid-fiber-coax (HFC) networks commonly used in cable television plants. In other embodiments, the network 204 may include microwave or other radio transceivers. The network interface 206 may provide the necessary interface between the network access point 202 and the network 204.

The controller 208 may be adapted to perform various functions, including authentication of a subscriber. The controller 208 may be a programmable microprocessor that is adapted to perform different functions, from monitoring the status of the network access point 202 and subscriber connections, to authenticating subscribers and performing various other functions.

Where the controller 208 performs authentication, the controller 208 may have access to a database of permitted subscribers for the network access point 202. In some cases, the database may be present within the network access point 202 while in other cases, the database may be located on another device connected to and accessed through the network 204.

A Global Positioning System (GPS) receiver 212 or other similar device may be present in the network access point 202 and may store the current geophysical location in a memory location 214. The GPS receiver 212 may detect the geophysical location of the network access point 202 by receiving satellite signals from several satellites in low earth orbit. Other systems may also be used for determining the physical location of the network access point 202. For example, the position of the network access point 202 may be determined by triangulation with other neighboring network access points or by having a technician use a hand held GPS receiver 216 to temporarily connect to the network access point 202 and store the network access point's geophysical location in a storage area 214 that may be accessible to the controller 208.

In some situations, the GPS or other geophysical location system may pinpoint the location of the network access point 202 relatively precisely, such as within a foot, while other systems may provide a more coarse location, such as within a square mile. Some embodiments where the network access points are spaced several miles apart, such as a cellular telephony network, a coarse location may be sufficient. In other embodiments where network access points are spaced more closely together, such as a bank of wired connection kiosks in an airport lounge or computer center of a university, or such as Bluetooth access points where the effective range of a connection is 30 feet or so, the geophysical location may be known much more precisely.

In some embodiments, the controller 208 may be adapted to respond to messages sent over the network 204. For example, a remote network device may send a broadcast message over the network 204 requesting devices within a certain geographical area to respond. The controller 208 may receive such a request and may be adapted to compare the geophysical location information from the stored area 214 with the geophysical area in the transmitted request. The controller 208 may then respond to the request appropriately. In some cases, a remote network device may send a request to the network access point 202 directly, as opposed to a broadcast request to many devices simultaneously.

Figure 3:
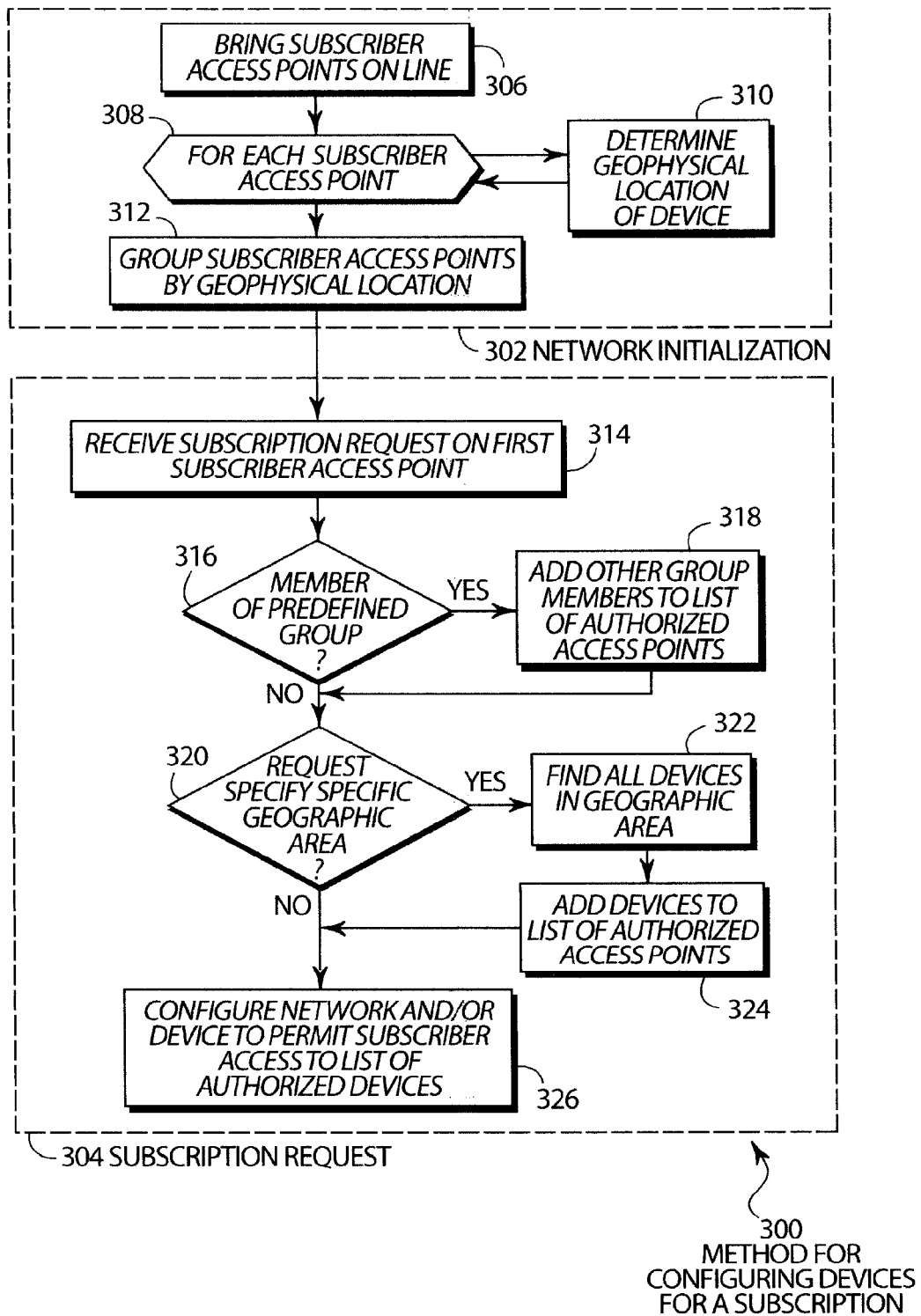
FIG. 3 is a flowchart illustration of an embodiment showing a method for configuring multiple devices for a subscription.

FIG. 3 is a flowchart illustration of an embodiment 300 showing a method for configuring network devices for a subscription based on the geophysical location for the devices. The flowchart comprises a network initialization sequence 302 and a subscription request sequence 304. In some embodiments, the initialization sequence 302 may be performed when the network is initially started and the subscription request sequence 304 may be performed when each subscriber joins the network.

In the initialization sequence 302, the subscriber access points are brought online in block 306. For each subscriber access point in block 308, the geophysical location is determined for that device in block 310. Subscriber access points may be grouped by geophysical location in block 312.

In the subscription request sequence 304, a subscription request may be received on a first subscriber access point device in block 314. If the subscriber access point is a member of a predefined group of access points in block 316, the other members of the group are added to a list of authorized access points in block 318. If the subscription request includes a specific geographical area in block 320, all the devices servicing the geographical area are found in block 322 and added to the list of authorized access points in block 324. In block 326, the network and/or the subscriber device are configured to permit access to the network for the subscriber at those access points on the list.

The embodiment 300 illustrates a method by which a network may be configured for a subscriber to access different network access points based on the geophysical location of the access points. In some instances, the subscriber access points may be grouped together based on geophysical location so that the entire group of access points are made available to the subscriber. In other instances, a subscriber may request access within a certain geographical area and additional devices may also be made available.

The initialization sequence 302 may be performed at various intervals, such as when the entire network is turned on, when maintenance is performed on the network, or when a device is added or removed from the network.

The determination of geophysical location of each device in block 310 may be an automated process where each device queries a built-in geophysical determination device, such as a GPS receiver. In other instances, a maintenance technician may program each device separately. In still other instances, the network devices may include wireless transceivers and may be capable of detecting neighboring devices. In such an instance, the devices may be able to determine their relative location by communicating with each other an triangulating their relative location.

As the location for each device is determined, some embodiments may have the location information for each device stored in a memory location within that device. In other cases, a centralized database may be located in a host device and may contain the geophysical locations for all the devices. In still other embodiments, all or a portion of such a database may be stored within the various devices along the network.

For example, in some embodiments, each network access point on a network may contain geophysical location information for neighboring devices but not all the devices on the network. In such an embodiment, a device may be able to establish contact with neighboring devices in order to process a subscription request that may include a request for access to neighboring devices.

In some embodiments, subscriber access points may be grouped by geophysical location. For example, if three wireless access points are used to provide subscriber access within a coffee shop or other retail venue, a subscription request made to one of such devices may include the other wireless access points within the venue by virtue of those subscriber access points being members of a group.

A network operator may configure a network in a deliberate fashion such that neighboring devices are connected to separate network branches or backbones. In such a situation, if one of the network branches or backbones is unavailable, the neighboring device on the other network branch or backbone may be used by a subscriber device to gain access. In such a case, neighboring devices on separate networks may be grouped together so that a subscriber that requests a subscription from one of the devices may be given access to the neighboring device in the event of the first network being unavailable.

When a subscriber access point is made a member of a group of subscriber access points, a subscription request may include access to all of the other subscriber access points that are members of that group. In some instances, the group may be an optional selection of the subscriber while in other instances, the group may not be a selectable option. A network operator may include backup devices or secondary access devices as members of a group of subscriber access points to provide a level of redundancy to ensure future access for a subscriber.

A host device or other centralized server may maintain various groups of subscriber access points. In some embodiments, information about groups of subscriber access points may be located within the subscriber access points that are affected by the groups. For example, each member of a group of subscriber access points may include a list of the other members of the group.

In some embodiments, a subscriber access point may be a member of several different groups of subscriber access points. In such an embodiment, a subscriber may be given a choice to access one or more of the groups of access points. For example, a subscriber may be given the option to configure the subscription to the single subscriber access point to which they first connected, to a first group of neighboring subscriber access points, to a second group of subscriber access points that cover a specific city, or to a group of subscriber access points that cover all locations over a multi-state region. Any rationale may be used for grouping subscriber access points.

When a subscriber makes a subscription request through a subscriber access point that is a member of a predefined group in block 316, the other members of the group are added to a list of authorized access points in block 318. In some embodiments, two or more groups of subscriber access points may be added to the list.

A subscriber may request a specific geographic area for a subscription. In some cases, the geographic area may be defined by a location point and a radius. In other cases, the geographic area may be defined by a rectangular or other shaped boundary. In still other cases, the geographic area may be defined as political or municipal boundaries, or the subscriber may create a user-defined geographic area.

After defining the geographic area in which the subscription is to be honored by devices on the network, those devices that service the geographic area may be located in block 322 and added to the list of authorized access points in block 324. The devices may be located by broadcasting a message over the network to devices in the area, querying a database of network access points using geophysical locations, by sending messages to neighboring devices, or by any other method that locates devices within the defined geographic area.

In some situations, a wireless network access device may be located outside of the defined geophysical area but may provide service within the area. In such cases, the geophysical description contained within the device may include the boundaries of service provided by that network access device.

The network may be configured in block 326 to permit access to the subscriber on the list of authorized access point devices. Various network configurations may be used. In one configuration, a centralized server or host device may contain a database of subscribers and the permitted access points for each subscriber. When an existing subscriber establishes contact with a network access point, a request may be made to the centralized server to authenticate whether the subscriber may be permitted to access the specific network access point. If the subscriber is permitted, a session may be established. If the subscriber is not permitted, a session may be denied.

In another configuration, a subscriber device may be loaded with data that enables connections to the particular network access devices on the list. For example, each subscriber access point may contain a particular password, encrypted setting, or other information that may authenticate the subscriber to the device.

In yet another configuration, each network access point may contain a list of permitted subscribers. When a subscriber attempts to access the network through the network access device, the subscriber will be checked against the list of permitted subscribers for that particular access point.

In still other configurations, information may be stored in a centralized server, individual network access points, and a subscriber device and may be used in any combination to determine whether the subscriber should have access to the network.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method in a network device comprising:
   determining the geophysical location of a plurality of devices on a wireless communication network, said devices comprising subscriber access points for said network, said plurality of devices comprising a first device, a second device, and a third device;
   receiving a subscription request on said first device from a subscriber device;
   presenting a plurality of geographic areas to a user of said subscriber device;
   receiving a selection for a specific geographic area;
   determining that said subscription request encompasses said specific geographic area;
   determining that said second device is within said specific geographic area;
   determining that said third device is outside said specific geographical area; and
   generating configuration information such that said subscriber device may connect to said first device and said second device but not said third device.

2. The method of claim 1 wherein said network comprises access to the Internet.

3. The method of claim 1 wherein said network comprises a wired backbone.

4. The method of claim 3 wherein said network comprises a hybrid fiber-coax network.

5. The method of claim 3 wherein said network comprises a twisted pair network.

6. The method of claim 1 wherein said subscriber access points comprises a wireless subscriber interface.

7. The method of claim 1 wherein said first of said devices comprises a database of subscribers authorized to use said one of said devices.

8. The method of claim 1 wherein said first of said devices comprises a global positioning system receiver.

9. The method of claim 1 wherein said first of said devices comprises a memory location comprising a geophysical location of said one of said devices.

10. The method of claim 1 further comprising:
    transmitting said configuration information to said first and said second of said plurality of devices.

11. The method of claim 1 further comprising:
transmitting said configuration information to said subscriber device.

12. A wireless communication network comprising:
a network backbone;
an Internet connection point to said network backbone; and
a plurality of network devices comprising a first network device, a second network device, and a third network device, each of said network devices comprising:
geophysical location information that is electronically accessible;
a subscriber interface; and
a subscriber authentication mechanism adapted to establish communications with a subscriber device, determine that said subscriber device has permission to gain network access through said network device, and establish network access for said subscriber device through said subscriber interface;
said network being adapted to:
receive a subscription request on said first network device from said subscriber device, said subscription request comprising a selection of a specific geographic area, said selection being made from a plurality of geographic areas presented to a user of said subscriber device;
determine that said subscription request encompasses said specific geographic area;
determine that said second network device is within said specific geographic area
determine that said third network device is outside said specific geographic area; and
generate configuration information such that said subscriber device may connect to said first and said second of said plurality of devices but not said third network device.

13. The network of claim 12 wherein said network further comprises access to the Internet.

14. The network of claim 12 wherein said network backbone comprises a wired backbone.

15. The network of claim 12 wherein said subscriber interface comprises a wireless subscriber interface.

16. The network of claim 12 wherein said first of said network devices comprises a database of subscribers authorized to use said one of said network devices.

17. The network of claim 12 wherein said first of said network devices comprises a global positioning system receiver.

18. The network of claim 12 wherein said first of said network devices comprises a memory location comprising a geophysical location of said one of said network devices.

19. The network of claim 12 further adapted to:
transmit said configuration information to said first and said second of said plurality of network devices.

20. The network of claim 12 further adapted to:
transmit said configuration information to said subscriber device.

* * * * *